(12) United States Patent
Shiroishi et al.

(10) Patent No.: US 7,602,604 B2
(45) Date of Patent: Oct. 13, 2009

(54) ELECTRONIC APPARATUS

(75) Inventors: Toshikazu Shiroishi, Tokyo (JP); Yuji Nakajima, Tokyo (JP); Yasuyuki Horii, Tokyo (JP); Takayuki Arisaka, Tokyo (JP); Ryosuke Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/016,158

(22) Filed: Jan. 17, 2008

(65) Prior Publication Data

US 2008/0297990 A1 Dec. 4, 2008

(30) Foreign Application Priority Data

May 30, 2007 (JP) .............................. 2007-143979

(51) Int. Cl.
*H05K 5/00* (2006.01)
*H05K 7/00* (2006.01)
*H05K 7/20* (2006.01)
*H01R 24/04* (2006.01)

(52) U.S. Cl. ............................... 361/679.45; 361/679.4; 361/690; 439/668

(58) Field of Classification Search ................. 361/679, 361/686, 679.01, 679.4, 679.45, 690; 439/668
See application file for complete search history.

(56) References Cited

U.S. PATENT DOCUMENTS

| | | | |
|---|---|---|---|
| 5,679,013 A | 10/1997 | Matsunaga et al. | |
| 6,305,986 B1 * | 10/2001 | Hwang | 439/610 |
| 6,722,924 B1 * | 4/2004 | Zhou et al. | 439/608 |
| 2003/0224637 A1 * | 12/2003 | Ling | 439/133 |
| 2006/0098924 A1 * | 5/2006 | Anderl et al. | 385/92 |
| 2006/0172599 A1 * | 8/2006 | Hankey et al. | 439/607 |

FOREIGN PATENT DOCUMENTS

| | | |
|---|---|---|
| JP | 08-138796 | 5/1996 |
| JP | 2003-345464 | 12/2003 |
| JP | 2006-331267 | 12/2006 |

\* cited by examiner

*Primary Examiner*—Jayprakash N Gandhi
*Assistant Examiner*—Anthony M Haughton
(74) *Attorney, Agent, or Firm*—Blakely, Sokoloff, Taylor & Zafman LLP

(57) ABSTRACT

According to one embodiment, an electronic apparatus includes: a main body including a housing; a wiring connection port which is provided in the housing of the main body and which has an insertion passage into which a wiring connection plug is to be inserted; one lock section whose portion protrudes into the insertion passage for the wiring connection port and which becomes displaced toward a housing upon contact with the wiring connection plug; and an opening section which is formed at a position on the housing which opposes the one lock section, wherein the one lock section having become displaced upon contact with the wiring connection plug enters the inside of the opening section.

20 Claims, 5 Drawing Sheets

ELECTRONIC APPARATUS

CROSS-REFERENCE TO RELATED APPLICATIONS

This application is based upon and claims the benefit of priority from Japanese Patent Application No. 2007-143979, filed May 30, 2007, the entire contents of which are incorporated herein by reference.

BACKGROUND

1. Field

One embodiment of the invention relates to an electronic apparatus equipped with a wiring connection port.

2. Description of the Related Art

JP-A-8-138796 shows an example structure for attaching a connector to an electronic apparatus. By means of such a structure for mounting a connector, a wire for use in transmitting data is connected to an electronic apparatus.

An electronic apparatus is requested to be slimmed down further when compared with a related-art electronic apparatus. However, when a wiring connection port, such as an USB port, is provided with a view toward achieving higher functionality of an electronic apparatus, the thickness of the wiring connection port poses difficulty in slimming down the electronic apparatus.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
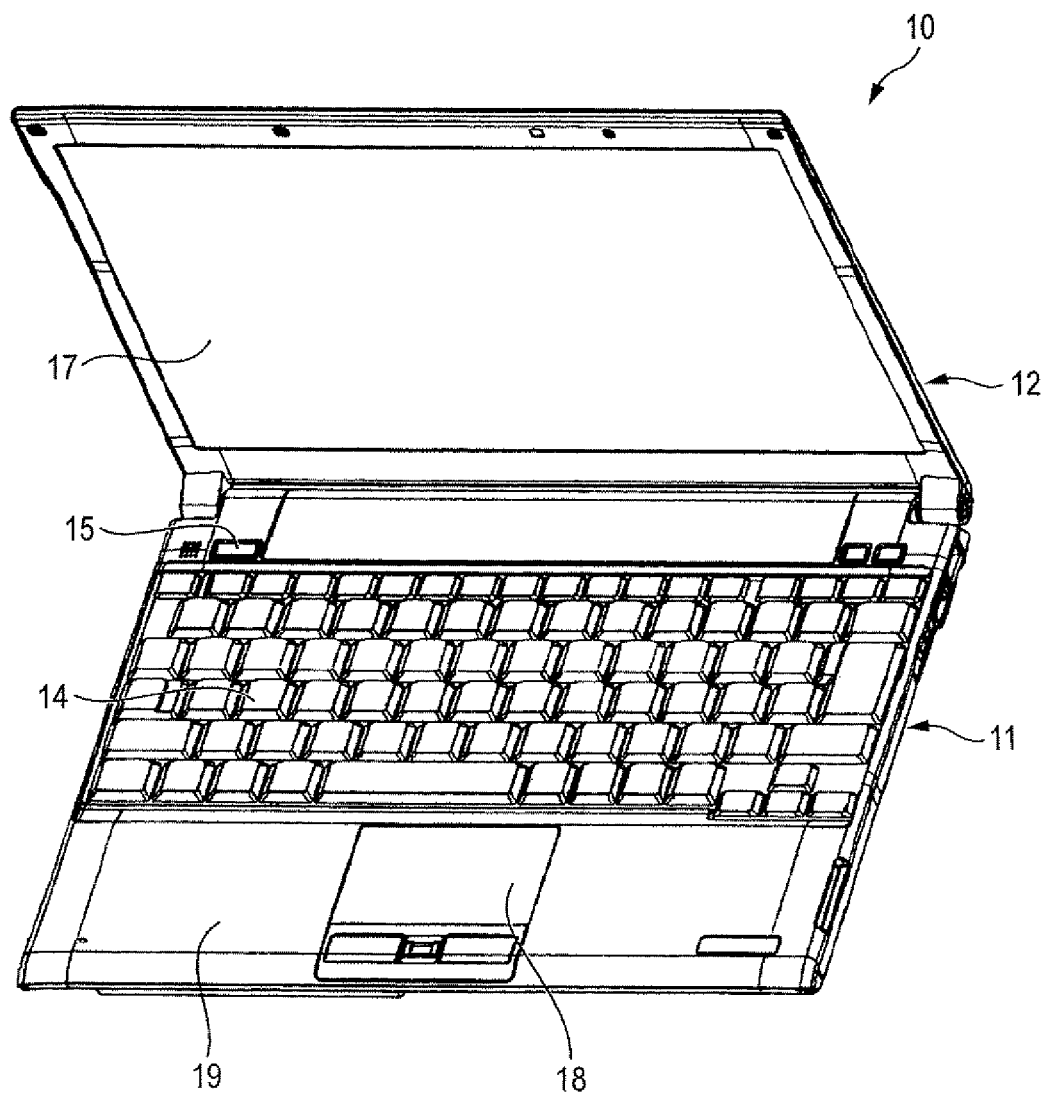
FIG. 1 is a perspective view showing a notebook personal computer according to an embodiment of the present invention.

Various embodiments according to the invention will be described hereinafter with reference to the accompanying drawings. In general, according to one embodiment of the invention, an electronic apparatus including: a main body including a housing; a wiring connection port which is provided in the housing of the main body and which has an insertion passage into which a wiring connection plug is to be inserted; one lock section whose portion protrudes into the insertion passage for the wiring connection port and which becomes displaced toward a housing upon contact with the wiring connection plug; and an opening section which is formed at a position on the housing which opposes the one lock section, wherein the one lock section having become displaced upon contact with the wiring connection plug enters the inside of the opening section.

A preferred embodiment of the present invention will be described in detail hereunder by reference to the accompanying drawings. In the descriptions, like elements or elements having like functions are assigned like reference numerals, and their repeated explanations are omitted.

FIG. 1 shows a notebook personal computer as an electronic apparatus 10 of an embodiment of the present invention. As shown in FIG. 1, the notebook personal computer 10 is comprised of a computer main body 11 and a display unit 12. A display device formed from an LCD (Liquid-Crystal Display) 17 is incorporated into the display unit 12, and a display screen of the LCD 17 is situated in essentially the center of the display unit 12.

The display unit 12 is attached to the computer main body 11 so as to become pivotal between an open position and a close position. The computer main body 11 has a low-profile box-shaped housing 19, and a keyboard unit 14, a power button 15 for activating/deactivating power of the personal computer 10, a touch pad 18, and others, are arranged on an upper surface of the housing 19. The entirety of the computer main body 11 is formed essentially into the shape of a plate.

Figure 2:
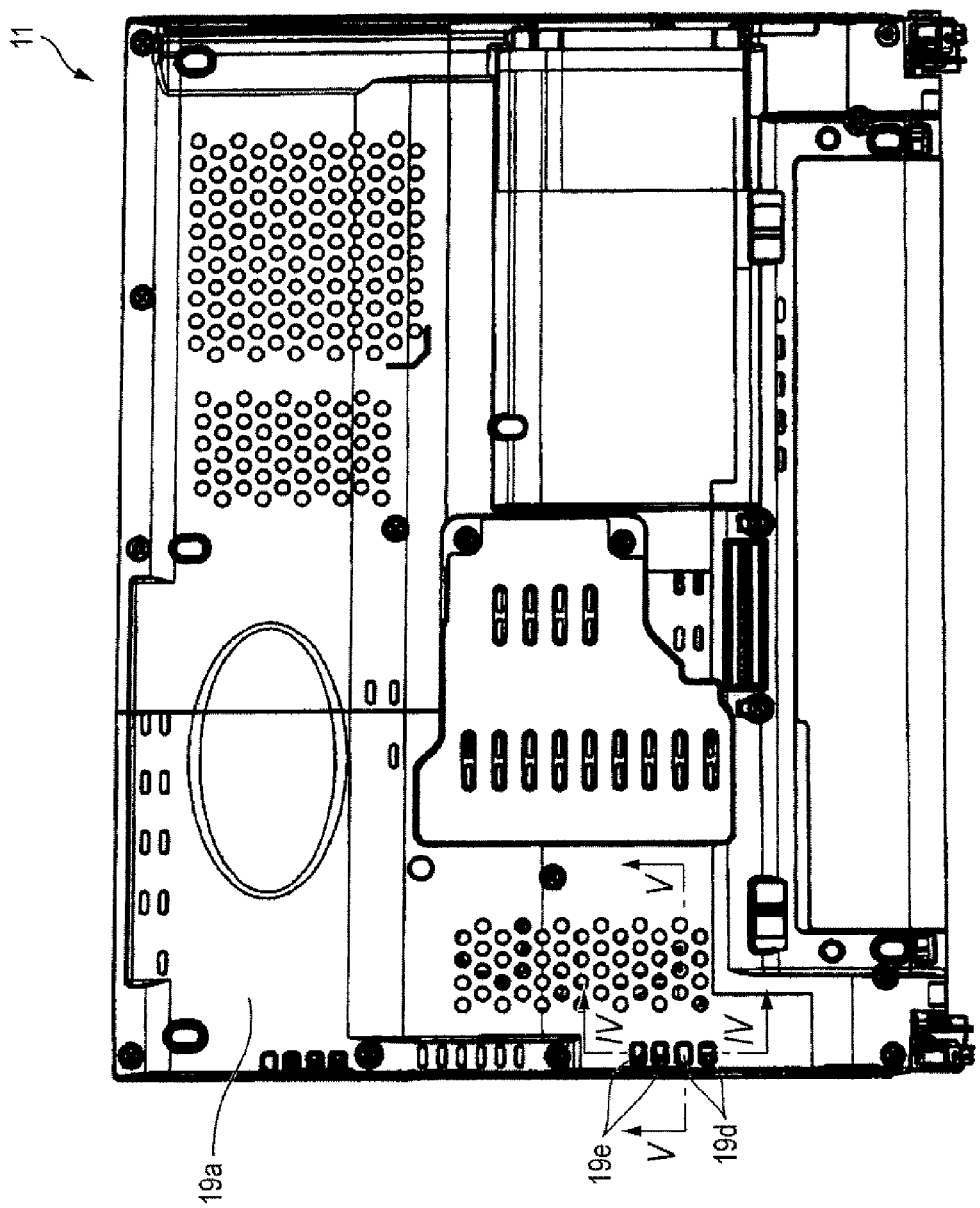
FIG. 2 is a bottom view showing a lower surface of the personal computer.
Figure 3:
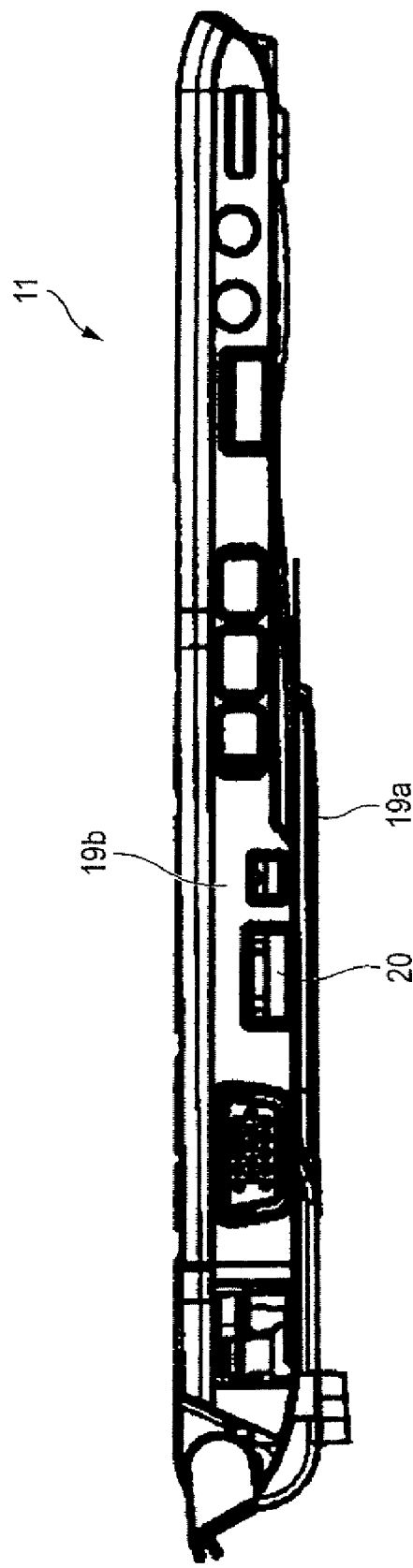
FIG. 3 is a side view showing a side surface of the personal computer.

By reference to FIGS. 2 and 3, a wiring connection port 20 provided in the computer main body 11 will now be described. FIG. 2 shows a housing lower surface 19a of the personal computer 10, and FIG. 3 shows a left-side housing surface 19b of the personal computer 10.

A wiring connection port (hereinafter called a "USB port") 20 complying with USB (Universal Serial Bus) standards is provided in the computer main body 11. The USB port 20 has an insert port which enables insertion of a wiring connection plug (hereinafter called a "USB plug") complying with the USB standards and which is provided in the left-side housing surface 19b of the computer main body 11. The USB port 20 is provided at a position that is close to the rear end of the computer main body 11 as well as close to the lower surface 19a of the computer main body 11. Since the USB port 20 requires a predetermined thickness, the USB port serves as one factor for determining the thickness of the computer main body 1.

Figure 4:
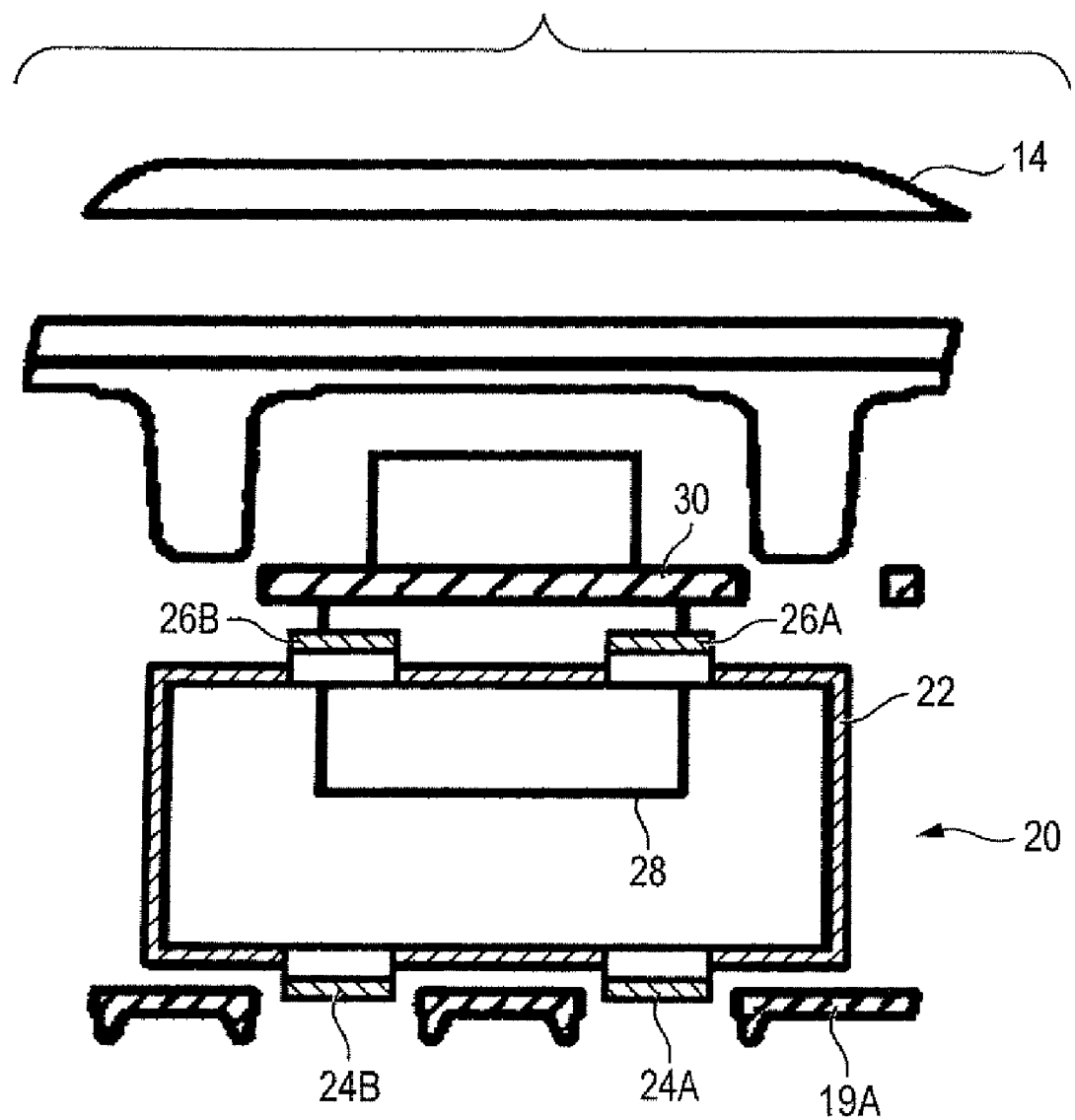
FIG. 4 is a cross-sectional profile showing a cross section taken along line IV-IV shown in FIG. 3.

The structure of the USB port 20 will now be described by reference to FIGS. 4 and 5. FIG. 4 is a cross-sectional profile showing a cross section taken along line IV-IV shown in FIG. 3, and FIG. 5 is a cross-sectional profile showing a cross section taken along line V-V shown in FIG. 3.

As shown in FIG. 4, the USB port 20 has a tubular member 22 having a rectangular cross-sectional profile appropriate for the USB plug. The inside of the tubular member 22 acts as a passage for insertion of the USB plug. The USB plug is guided into a deeper position within the USB port 20 along the passage. A connection member 28 having a plurality of terminals is provided at the deep position within the USB port 20. When the USB plug is fully inserted into the USB port 20, the terminal of the USB plug is connected to the terminal of the connection member 28. Consequently, a signal from the USB plug can be transmitted to a main circuit board 30 by way of the USB port 20.

Fourth lock springs 24A, 24B, 26A, and 26B are formed in areas of the tubular member 22. Two lock springs 24A and 24B are provided on the lower surface 19a of the computer main body 11, and the other two lock springs 26A and 26B are provided on the main circuit board 30. The two lock springs 24A and 24B on the housing lower surface 19a of the computer main body 11 are spaced apart from each other a predetermined distance with regard to the front-to-back direction of the computer main body 11. Likewise, the two lock springs 26A and 26B on the main circuit board 30 are spaced apart from each other a predetermined distance with regard to the front-to-back direction of the computer main body 11.

Figure 5:
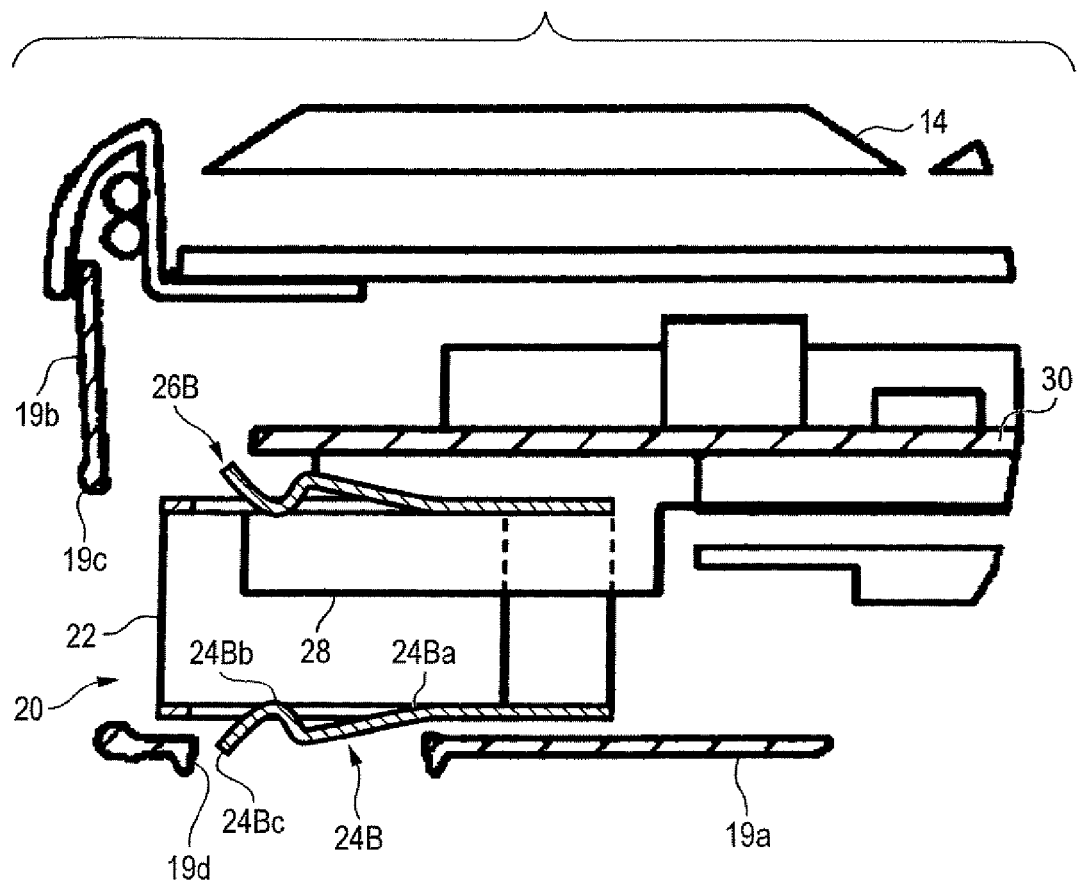
FIG. 5 is a cross-sectional profile showing a cross section taken along line V-V shown in FIG. 3.

As shown in FIG. 5, the respective four lock springs 24A, 24B, 26A, and 26B are integrally provided with the tubular member 22. The lock springs will be described by means of taking the lock spring 24B as a typical lock spring. Each of the lock springs 24A, 24B, 26A, and 26B has a base end portion 24Ba connected to the tubular member 22, a distal end portion 24Bc opened at an end opposite to the base end portion 24Ba, and a contact portion 24Bb interposed between the base end portion 24Ba and the distal end portion 24Bc. The respective lock springs 24A, 24B, 26A, and 26B extend from the base end portion 24Ba toward an insertion port 19c formed in the housing side surface 19b. Each of the respective lock springs 24A, 24B, 26A, and 26B extends toward the insertion portion 19c while gradually spreading outwardly, undergoes bending in the vicinity of the contact portion 24Bb and enters the passage, and again spreads outwardly, to thus reach the distal end portion 24Bc. The contact portion 24Bb that is one of the lock springs 24A, 24B, 26A, and 26B protrudes into the passage.

When the USB plug is inserted into the USB port 20, the USB plug comes into contact with the contact portion 24Bb of the lock springs 24A, 24B, 26A, and 26B. As a result, the lock springs 24A, 24B, 26A, and 26B are deflected outwardly, to thus become displaced. In particular, the lock springs 24A and 24B provided on the housing lower surface 19a of the computer main body 11 are displaced toward the housing lower surface 19a of the computer main body 11. Subsequently, when the USB plus is fully inserted into the USB port 20, the contact portions of the respective lock springs 24A, 24B, 26A, and 26B enter a recess formed in a common USB plug, thereby locking the USB plug. Thus, removal of the USB plug from the USB port 20 is prevented.

In the personal computer 10 of the present embodiment, an opening section 19d for avoiding interference with the lock springs 24A and 24B is formed at a position, on the housing lower surface 19a of the computer main body 11, which opposes the lock springs 24A and 24B. When the lock springs 24A and 24B have become displaced toward the housing lower surface 19a of the computer main body 11 in the middle of insertion of the USB plug into the USB port 20, the lock springs 24A and 24B having become displaced upon contact with the USB plug enter the inside of the opening section 19d. Consequently, the USB port 20 can be placed at a position close to the housing lower surface 19a, so that the computer main body 11 can be slimmed down.

Turning again to FIG. 2, the two opening sections 19d for avoiding interference formed in the housing lower surface 19a will be described. The two opening sections 19d for avoiding interference assume the same shape as that of two airflow orifices 19e formed also in the housing lower surface 19a and are positioned along with the airflow orifices 19e side by side. As a result, the opening sections 19d for avoiding interference serve as the airflow orifices as well as avoiding interference with the lock springs 24A and 24B, thereby contributing to a decrease in the internal temperature of the housing. Moreover, the airflow orifices 19d can also prevent the opening sections 19d for avoiding interference from becoming particularly conspicuous. Moreover, the opening sections 19d for avoiding interference also contribute to a reduction in the weight of the personal computer 10.

Although the opening sections 19d are formed so as to correspond to the respective lock springs 24A and 24B in a one-to-one correspondence in the present embodiment, one opening section 19d may also be formed so as to correspond to the plurality of lock springs 24A and 24B. In the present embodiment, the two lock springs 24A and 24B are provided on the housing lower surface 19a of the computer main body 11, one or three or more lock springs may also be provided in another embodiment.

In the above embodiment, the wiring connection port is in conformance with the USB standards. However, in another embodiment, the wiring connection port may conform to another standard or may not conform to the standards.

Although the foregoing embodiment has illustrated the notebook personal computer 10 as an example of an electronic apparatus, an electronic apparatus of another type may also be used in another embodiment.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a main body including a housing;
   a wiring connection port which is provided in the housing of the main body and which has an insertion passage into which a wiring connection plug is to be inserted;
   a lock section whose portion protrudes into the insertion passage for the wiring connection port and which becomes displaced toward a housing upon contact with the wiring connection plug; and
   an opening section which is formed at a position on the housing which opposes the lock section, wherein the lock section having become displaced upon contact with the wiring connection plug enters the inside of the opening section;
   an air flow orifice formed in the housing to allow a cooling air to flow therethrough, the air flow orifice being arranged side-by-side with the opening section.

2. The electronic apparatus according to claim 1, wherein when the wiring connection plug is fully inserted into the insertion passage, the portion of the lock section enters a recess formed in the wiring connection plug, thereby locking the wiring connection plug.

3. The electronic apparatus according to claim 1, wherein the lock section is a leaf spring which becomes deflected toward the housing upon contact with the wiring connection plug.

4. The electronic apparatus according to claim 1, wherein the lock section is provided integrally with the wiring connection port.

5. The electronic apparatus according to claim 1, wherein the opening section being one of a plurality of opening sections formed in the housing, each of the plurality of opening sections corresponding to one of a plurality of lock sections.

6. The electronic apparatus according to claim 1, wherein the opening section being formed in the housing and corresponding to a plurality of lock sections including the lock section.

7. The electronic apparatus according to claim 1, wherein the wiring connection port conforms to USB standards.

8. The electronic apparatus according to claim 1, wherein the air flow orifice having the same shape as the opening section.

9. The electronic apparatus according to claim 1, wherein an opening of the wiring connection port is provided in a side surface of the housing being on a plane different from a plane along which the opening section is formed.

10. The electronic apparatus according to claim 1, wherein the wiring connection port is formed and accesible at a side surface of the housing, and the opening section is formed at a bottom surface of the housing, a plane including the side surface of the housing being substantially perpendicular to a plane including the bottom surface of the housing.

11. The electronic apparatus according to claim 1, wherein the housing includes a plurality of holes are formed on a peripheral portion of a bottom surface of the housing, the plurality of holes including the opening section and the air-flow orifice and being the same shape.

12. An electronic apparatus comprising:
a main body including a housing;
a wiring connection port situated along a side surface of the housing of the main body, the wiring connection port including an insertion passage adapted to receive a wiring connection plug;
a lock section protruding into the insertion passage of the wiring connection port, the lock section to become displaced toward a bottom surface of the housing upon contact with the wiring connection plug;
an opening section formed along a bottom surface of the housing and opposing the lock section, the opening section to receive the lock section that is displaced upon coming into contact with the wiring connection plug being placed inside the insertion passage; and
an air flow orifice formed along the bottom surface of the housing to allow a cooling air to flow into the insertion passage, the air flow orifice being arranged side-by-side with the opening section.

13. The electronic apparatus according to claim 12, wherein the lock section enters a recess formed in the wiring connection plug when the wiring connection plug is fully inserted into the insertion passage, thereby locking the wiring connection plug.

14. The electronic apparatus according to claim 12, wherein the lock section is a leaf spring which becomes deflected toward the housing upon contact with the wiring connection plug.

15. The electronic apparatus according to claim 12, wherein the wiring connection port conforms to Universal Serial Bus (USB) standards.

16. The electronic apparatus according to claim 12, wherein the air flow orifice has the same dimensions as the opening section.

17. The electronic apparatus according to claim 12, wherein the wiring connection port is provided along the side surface of the housing being within a different plane than a plane including the bottom surface.

18. An electronic apparatus comprising:
a housing;
a wiring connection port situated along a first surface of the housing, the wiring connection port including an insertion passage adapted to receive a wiring connection plug;
a lock section protruding into the insertion passage of the wiring connection port, the lock section to become displaced outwardly upon coming into contact with the wiring connection plug;
an opening section formed along a second surface of the housing different than the first surface, the opening section and opposing the lock section, the opening section to accommodate the displaced lock section; and
an air flow orifice formed along the second surface of the housing to allow a cooling air to flow into the insertion passage, the air flow orifice being arranged side-by-side with the opening section.

19. The electronic apparatus according to claim 18, wherein the air flow orifice has the same dimensions as the opening section.

20. The electronic apparatus according to claim 18, wherein the wiring connection port is provided along the first surface being a side surface of the housing and the opening section and the air flow orifice are provided along the second surface being a bottom surface of the housing forming a different plane than a plane including the side surface.

* * * * *